(12) United States Patent
Yakuwa

(10) Patent No.: US 8,142,854 B2
(45) Date of Patent: Mar. 27, 2012

(54) METHOD FOR FORMING CORROSION-RESISTANT FILM AND HIGH-TEMPERATURE APPARATUS MEMBER

(75) Inventor: Hiroshi Yakuwa, Tokyo (JP)

(73) Assignee: Ebara Corporation, Tokyo (JP)

( * ) Notice: Subject to any disclaimer, the term of this patent is extended or adjusted under 35 U.S.C. 154(b) by 1034 days.

(21) Appl. No.: 12/078,283

(22) Filed: Mar. 28, 2008

(65) Prior Publication Data
US 2008/0241558 A1    Oct. 2, 2008

(30) Foreign Application Priority Data
Mar. 29, 2007    (JP) ................. 2007-088429

(51) Int. Cl.
*B05D 3/02* (2006.01)
(52) U.S. Cl. .................................... 427/383.1
(58) Field of Classification Search .......... 427/357, 427/383.1
See application file for complete search history.

(56) References Cited

U.S. PATENT DOCUMENTS

| | | | | |
|---|---|---|---|---|
| 3,640,815 | A * | 2/1972 | Schwartz et al. | 205/191 |
| 5,622,638 | A * | 4/1997 | Schell et al. | 219/121.64 |
| 2006/0035102 | A1* | 2/2006 | Darolia et al. | 428/615 |
| 2007/0125459 | A1* | 6/2007 | Gupta et al. | 148/535 |

FOREIGN PATENT DOCUMENTS

| | | |
|---|---|---|
| JP | 05042425 A * | 2/1993 |
| JP | 2001-262357 | 9/2001 |

OTHER PUBLICATIONS

F. Riffard et al., "Yttrium sol-gel coating effects on the cyclic oxidation behaviour of 304 stainless steel", Corrosion Science, vol. 45, pp. 2867-2880, 2003.

Chester T. Sims et al., "Superalloys II", A Wiley-Interscience Publication, John Wiley & Sons, pp. 308-309, 1987.

* cited by examiner

*Primary Examiner* — Nathan Empie
(74) *Attorney, Agent, or Firm* — Wenderoth, Lind & Ponack, L.L.P.

(57) ABSTRACT

There is provided a method for forming a corrosion-resistant protective film, which can preventing peel off of the protective film and enables long-term stable use of the film under high-temperature conditions. The corrosion-resistant film forming method includes the steps of: carrying out Ni (or Ni—B) plating of a surface of a substrate of a Ni—Cr alloy to form a Ni (or Ni—B) layer on the substrate surface; and carrying out Al diffusion treatment of the surface of the Ni (or Ni—B) layer to form a protective layer of Ni—Al.

4 Claims, 8 Drawing Sheets

(1) Forming a Ni-B layer (2) Al diffusion treatment
Mixed powder of Al, $Al_2O_3$ and $NH_4Cl$, and Al diffusion treatment is carried out, for example at 800°C for 4 hours in an Ar inert atmosphere.

(3) Forming a protective coating (1) Forming a Ni-B layer (2) Forming a ZrO₂ layer (3) Al diffusion treatment Mixed powder of Al, Al₂O₃ and NH₄Cl, and Al diffusion treatment is carried out, for example at 800°C for 4 hours in an Ar inert atmosphere.

(4) Forming a protective coating

FIG. 8
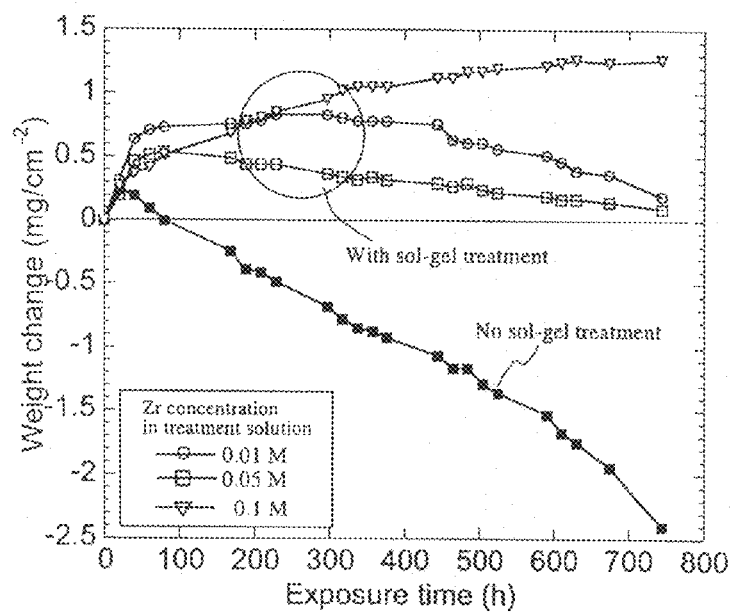
FIG. 9     FIG. 10     FIG. 11     FIG. 12
Non-protective oxide (corrosion product)
Protective oxide film
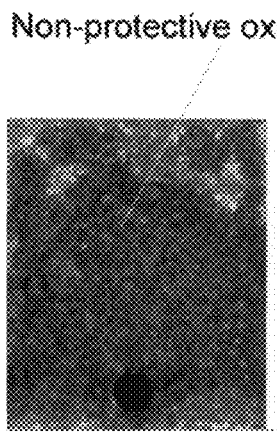
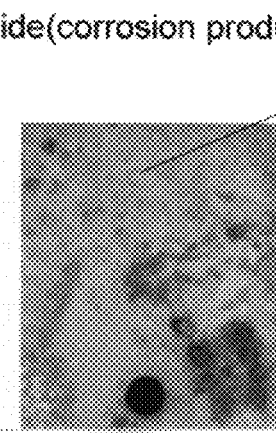
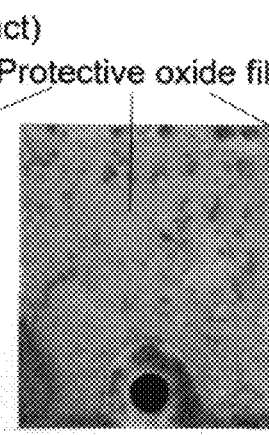
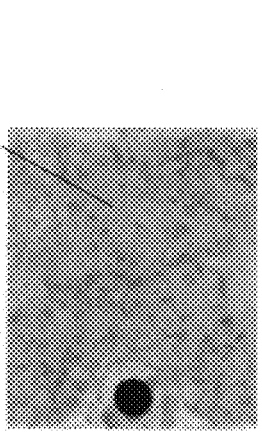

Al diffusion treatment

Mixed powder of Al, $Al_2O_3$ and $NH_4Cl$, and Al diffusion treatment is carried out between 700 and 900°C in hydrogen or inert atmosphere.

| Element analysis of surface (at%) | | | | | |
|---|---|---|---|---|---|
| Zr | Ni | Cr | O | Al | Co |
| 1.7 | 54.4 | 5.9 | 11.5 | 19.7 | 6.8 |

METHOD FOR FORMING CORROSION-RESISTANT FILM AND HIGH-TEMPERATURE APPARATUS MEMBER

BACKGROUND OF THE INVENTION

1. Field of the Invention

The present invention relates to a method for forming a corrosion-resistant film for use in a high-temperature apparatus member which is used at high temperatures, such as an industrial gas turbine, a jet engine, a micro gas turbine, an engine, a heat exchanger or a combustor, and also to a high-temperature apparatus member that uses the corrosion-resistant film.

2. Description of the Related Art

High-temperature apparatus members, such as an industrial gas turbine blade and a boiler tube, often have a surface coating in order to enhance the heat resistance and the corrosion resistance. Ceramic coating, called thermal barrier coating (TBC), is generally employed to enhance heat resistance. On the other hand, a Cr or Al diffusion/penetration treatment, thermal spraying of a high Ni-high Cr alloy, or other treatments are employed to enhance corrosion resistance. Thermal spraying, because of its high film-forming rate, is suited for forming a film having a relatively large thickness (not less than 100 μm). However, because of restrictions on the shape and size of a spray gun, thermal spraying is not suited for forming a thin film or forming a film on an article having a complicated shape.

On the other hand, the Cr or Al diffusion treatment to form a protective layer is a gas-phase diffusion method, and therefore is applicable to a fairly complicated article. As shown in FIG. 13, conventional Al diffusion/penetration treatment is carried out by burying a substrate in a mixed powder of Al or Al+M (M is Ni, Co or Cr) with $Al_2O_3$, and heating the system at 700 to 900° C. in a hydrogen or inert gas atmosphere. When the substrate is made of a Ni-based alloy, a Ni—Al compound is formed on the surface. The composition of the Ni—Al compound varies depending on the Al concentration of the mixed powder.

Such an Al-rich surface protective layer thus formed, when used in a high-temperature apparatus member, will form an $Al_2O_3$ film in the surface at a high temperature. While the $Al_2O_3$ film functions as a good protective film because of its low substance diffusion velocity, the film has the drawback that it is likely to peel off e.g. by thermal stress. When the formation of such an $Al_2O_3$ film is expected, therefore, it is necessary to use a technique for preventing peel off of the film. In this regard, addition of a small amount of an active element, such as Zr, Hf, Ce, La or Y, to an Al-rich protective layer is known to be effective for preventing peel off of an $Al_2O_3$ film from the protective layer. The addition of such an active element is practiced by a physical method, such as thermal spraying or physical vapor deposition. With such a physical method, however, the addition is sometimes difficult for a member having a complicated shape.

The present inventors conducted an experiment, in which a high-temperature member of Ni-20 mass % Cr-10 mass % Mo-18 mass % Fe alloy was subjected to an Al diffusion treatment by the conventional method, and the thus-treated member was exposed to heat at 1000° C. for over 1000 hours. As a result, not only peel off of a surface $Al_2O_3$ film was observed, but peel off of a protective layer itself was also observed. Cross-sectional observation of the peel-off portion and its vicinity of the protective layer revealed the formation of a Cr(Mo)-rich layer at the interface between the protective layer and the substrate as well as the formation of a large number of voids at the interface between the Cr(Mo)-rich layer and the substrate, as shown in FIG. 14.

The formation of the Cr(Mo)-rich layer can be explained schematically by using the Ni—Cr—Al ternary phase diagram shown in FIG. 15. When Al diffuses from Ni-50 at % Al toward Ni-about 35 at % Cr (Mo, Fe) (part of Cr may be substituted with Mo and Fe), a two-phase structure, consisting of an α-Cr phase and a γ-NiCr phase, comes to be formed. The Cr(Mo)-rich layer is thus formed at the interface between the substrate and the Ni—Al protective layer. It is considered that as the Cr(Mo) layer grows, voids form due to differences in diffusion velocity between the elements, and the voids will cause peel off of the protective layer.

In addition to prevention of peel off of a Ni—Al coating layer per se, it is also important for extension of the life of a member to secure the adhesion of an $Al_2O_3$ film to be formed in the surface of the coating layer.

Such peel off of a protective layer is determined by the composition of a substrate alloy and the diffusion conditions of Al. It is, however, desirable not to change the Al diffusion conditions e.g. from the viewpoint of film-forming rate.

SUMMARY OF THE INVENTION

It is therefore an object of the present invention to provide a method for forming a corrosion-resistant film, which can suppress the formation of an α-Cr phase and prevent peel off of an $Al_2O_3$ film, thereby preventing peel off of the corrosion-resistant film (protective layer) and enabling long-term stable use of the film under high-temperature conditions, and to provide a high-temperature apparatus member which uses the corrosion-resistant film.

In order to achieve the object, according to a first aspect of the present invention, there is provided a method for forming a corrosion-resistant film, comprising the steps of: carrying out Ni plating of a surface of a substrate of a Ni—Cr alloy, which is an alloy containing 20 mass % or more of Cr, to form a Ni layer on the substrate surface; and carrying out Al diffusion treatment of the surface of the Ni layer to form a protective layer of Ni—Al. The Ni plating may be carried out either by electroplating or by electroless plating such as Ni—P or Ni—B electroless plating.

According to the present method, a Ni layer is first formed on a substrate surface by Ni plating of the surface. Accordingly, after the subsequent Al diffusion treatment, the equivalent of Cr (total amount of metal elements forming an α phase in a Ni-based alloy) is nearly zero in the interface region between the Ni—Al layer formed and the substrate. There is, therefore, no formation of an α-Cr layer in the interface region by the Al diffusion treatment, and thus no formation of voids with the growth of an α-Cr layer.

The thickness of the Ni plating layer is preferably in the range of 5 to 50 μm. When the thickness is less than 5 μm, it is possible that the interface between the Ni—Al layer after the Al diffusion treatment and the substrate may lie within the substrate. On the other hand, because the Ni—Al layer is relatively fragile, cracks are likely to be produced in the Ni—Al layer e.g. due to heating cycle when the thickness of the Ni plating layer exceeds 50 μm. The thickness of the Ni plating layer is more preferably 10 to 30 μm.

In a preferred embodiment of the present invention, a $ZrO_2$ layer is formed on the substrate surface by a sol-gel method after the formation of the Ni layer, and the Al diffusion treatment is carried out on the $ZrO_2$ layer.

According to this embodiment, by the simple method of carrying out the Al diffusion treatment on the $ZrO_2$ layer formed by a sol-gel method, it becomes possible to allow Zr to diffuse into at least part of the protective film of Ni—Al alloy, thereby enhancing adhesion between the Ni—Al alloy film and an $Al_2O_3$ film which will be later formed in the surface of the Ni—Al alloy film.

According to a second aspect of the present invention, there is provided a method for forming a corrosion-resistant film, comprising the steps of: carrying out Ni—B plating of a surface of a substrate of a Ni—Cr alloy to form a Ni—B layer on the substrate surface; and carrying out Al diffusion treatment of the surface of the Ni—B layer to form a protective layer of Ni—Al(B).

According to the present method, a Ni—B layer is first formed on a substrate surface by Ni—B plating of the surface. Accordingly, after the subsequent Al diffusion treatment, the equivalent of Cr (total amount of metal elements forming an α phase in a Ni-based alloy) is nearly zero in the interface region between the Ni—Al layer formed and the substrate. There is, therefore, no formation of an α-Cr layer in the interface region by the Al diffusion treatment, and thus no formation of voids with the growth of an α-Cr layer. Most of boron (B) compounds as can be formed upon Ni—B plating, have a relatively high melting point and thus will not cause a significant problem in its use at high temperatures.

The thickness of the Ni—B layer is preferably in the range of 5 to 50 μm. When the thickness is less than 5 μm, it is possible that the interface between the Ni—Al layer after the Al diffusion treatment and the substrate may lie within the substrate. On the other hand, because the Ni—Al layer is relatively fragile, cracks are likely to be produced in the Ni—Al layer e.g. due to heating cycle when the thickness of the Ni—B layer exceeds 50 μm. The thickness of the Ni—B layer is more preferably 10 to 30 μm.

In a preferred embodiment of the present invention a $ZrO_2$ layer is formed on the substrate surface by a sol-gel method after the formation of the Ni—B layer, and the Al diffusion treatment is carried out on the $ZrO_2$ layer.

According to this embodiment, by the simple method of carrying out the Al diffusion treatment on the $ZrO_2$ layer formed by a sol-gel method, it becomes possible to allow Zr to diffuse into at least part of the protective film of Ni—Al alloy, thereby enhancing adhesion between the Ni—Al alloy film and an $Al_2O_3$ film which will be later formed in the surface of the Ni—Al alloy film.

According to a third aspect of the present invention, there is provided in a method for forming a corrosion-resistant protective film of a Ni—Al alloy on a surface of a substrate of a Ni-based alloy by carrying out Al diffusion treatment of the substrate surface, the improvement comprising carrying out the Al diffusion treatment after forming a $ZrO_2$ layer on the substrate surface by a sol-gel method, thereby allowing Zr to diffuse into at least part of the protective film of Ni—Al alloy.

According to a fourth aspect of the present invention, there is provided in a method for forming a corrosion-resistant protective film of a Ni—Al alloy on a surface of a substrate of a Ni—Cr alloy by carrying out Al diffusion treatment of the substrate surface, the improvement comprising carrying out the Al diffusion treatment after forming a $ZrO_2$ layer on the substrate surface by a sol-gel method, thereby allowing Zr to diffuse into at least part of the protective film of Ni—Al alloy.

According to these methods, by the simple method of carrying out the Al diffusion treatment on the $ZrO_2$ layer formed by a sol gel method, it becomes possible to allow Zr to diffuse into at least part of the protective film (layer) of Ni—Al alloy, thereby enhancing adhesion between the protective Ni—Al alloy film and an $Al_2O_3$ film which will be later formed in the surface of the protective film.

According to a fifth aspect of the present invention, there is provided a high-temperature apparatus member having in its surface the above-described protective layer of Ni—Al(B) or Ni—Al.

According to the present invention, peel off of a protective film of a Ni—Al alloy, formed by Al diffusion treatment, can be prevented, enabling long-term stable use of the protective film under high-temperature conditions.

BRIEF DESCRIPTION OF THE DRAWINGS

FIG. 8 is a graph showing mass changes in the specimens of Examples 1, 3 to 5 during a high-temperature corrosion test;

FIG. 9 is a photograph of a surface of the specimen of Example 1 after the high-temperature corrosion test;

FIG. 10 is a photograph of a surface of the specimen of Example 3 after the high-temperature corrosion test;

FIG. 11 is a photograph of a surface of the specimen of Example 4 after the high-temperature corrosion test;

FIG. 12 is a photograph of a surface of the specimen of Example 5 after the high-temperature corrosion test;

DETAILED DESCRIPTION OF THE PREFERRED EMBODIMENTS

Preferred embodiments of the present invention will now be described in detail with reference to the drawings.

Figure 1:
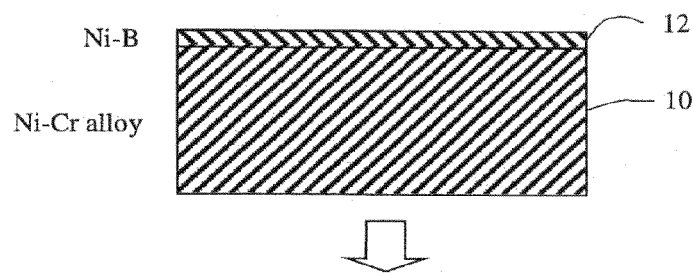
FIG. 1 is a diagram illustrating a corrosion-resistant film forming method according to a first embodiment of the present invention.
Figure 1:
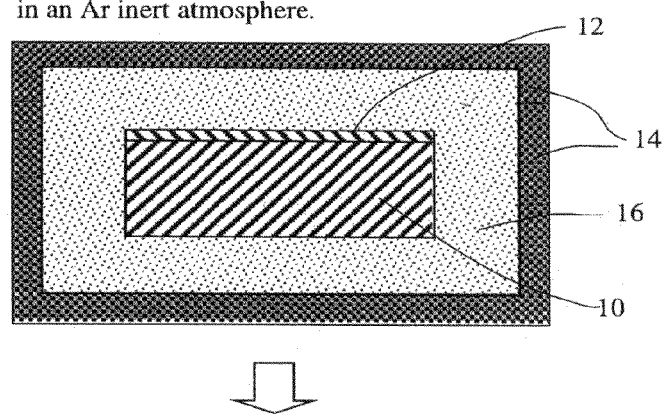
Figure 1:
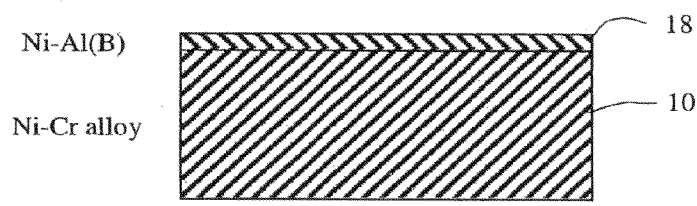

FIG. 1 illustrates a corrosion-resistant film forming method according to an embodiment of the present invention. The method comprises the steps of: (1) forming a Ni—B layer 12 on the surface of a substrate 10 of a Ni—Cr alloy; and (2) covering the substrate surface with a mixed powder 16 of Al, $Al_2O_3$ and $NH_4Cl$ in a closed vessel 14, and carrying out Al diffusion treatment at a predetermined temperature for a predetermined time in a predetermined atmosphere, (3) thereby causing Al to diffuse into the Ni—B layer to form a protective layer 18 of a Ni—Al alloy.

Figure 2:
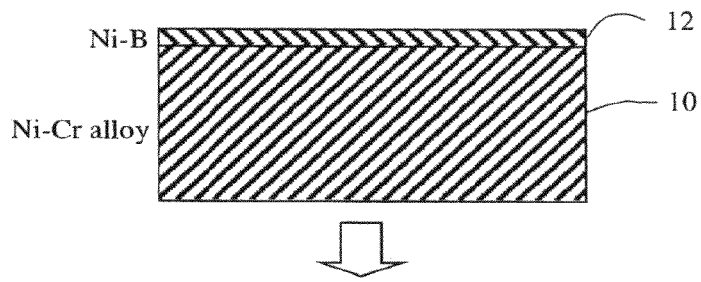
FIG. 2 is a diagram illustrating a corrosion-resistant film forming method according to a second embodiment of the present invention.
Figure 2:
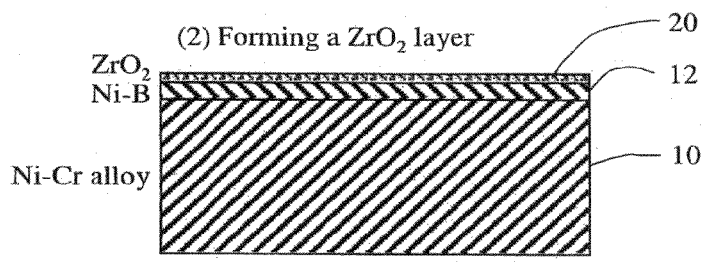
Figure 2:
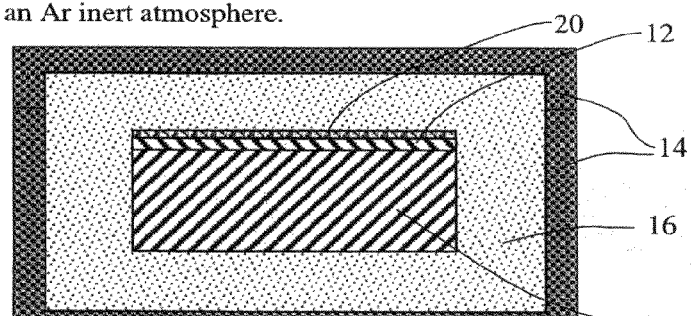
Figure 2:

FIG. 2 illustrates a corrosion-resistant film forming method according to another embodiment of the present invention. The method comprises the steps of: (1) forming a Ni—B layer 12 on the surface of a substrate 10 of a Ni—Cr alloy; (2) forming a $ZrO_2$ layer 20 on the surface of the Ni—B layer 12 by a sol-gel method; (3) covering the substrate surface with a mixed powder 16 of Al, $Al_2O_3$ and $NH_4Cl$ in a closed vessel 14, and carrying out Al diffusion treatment at a predetermined temperature for a predetermined time in a predetermined atmosphere, (4) thereby causing Al to diffuse into the Ni—B layer to form a protective layer 18A of a Ni—Al alloy, with Zr diffused into at least part of the protective layer.

In the above-described methods, instead of carrying out Ni—B electroless plating to form the Ni—B layer, it is also possible to carry out Ni electroplating or electroless Ni—P plating.

Example 1

Figure 3:
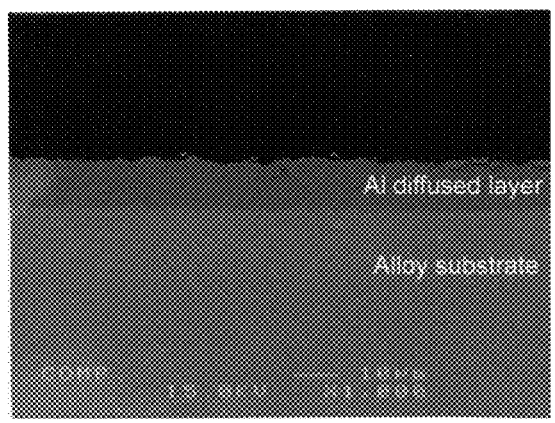
FIG. 3 is a photomicrograph of a cross section of a specimen after treatment in Example 1.

Ni—B electroless plating was carried out on a substrate (specimen) of Ni-20 mass % Cr-18 mass % Fe-10 mass % Mo alloy to form a Ni—B plating film having a thickness of about 20 μm on the substrate. Thereafter, the substrate was buried in a mixed powder of Al, $Al_2O_3$ and $NH_4Cl$, and Al diffusion treatment of the substrate surface was carried out at 800° C. for 4 hours in an Ar atmosphere to form a Ni—Al(B) protective film. FIG. 3 shows a cross section of the protective layer. As can be seen from FIG. 3, there was no formation of a Cr(Mo)-rich layer at the interface between the substrate and the Ni—Al(B) layer.

Example 2

Figure 17:
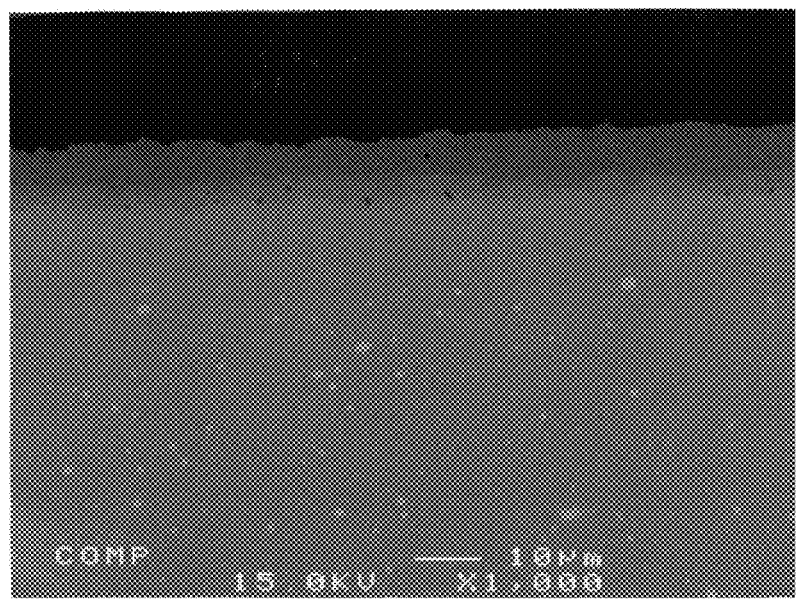
FIG. 17 is a photomicrograph of a cross section of a specimen after treatment in Example 2.

Ni electroplating was carried out on a substrate (specimen) of Ni-20 mass % Cr-18 mass % Fe-10 mass % Mo alloy to form a Ni plating film having a thickness of about 20 μm on the substrate. Thereafter, the substrate was buried in a mixed powder of Al, $Al_2O_3$ and $NH_4Cl$, and Al diffusion treatment of the substrate surface was carried out at 800° C. for 4 hours in an Ar atmosphere to form a Ni—Al protective film. FIG. 17 shows a cross section of the protective layer. As can be seen from FIG. 17, there was no formation of a Cr(Mo)-rich layer at the interface between the substrate and the Ni—Al layer.

Comparative Example 1

Figure 4:
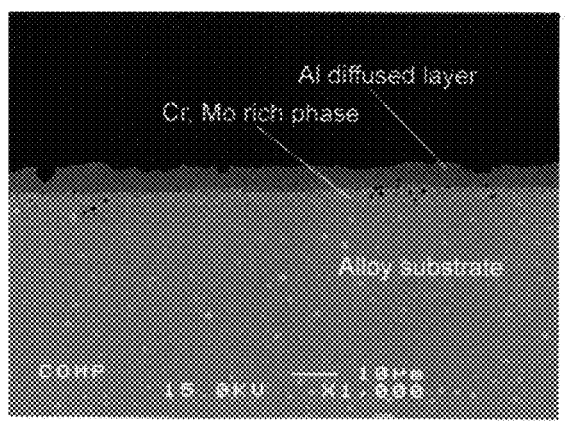
FIG. 4 is a photomicrograph of a cross section of a specimen after treatment in Comp. Example 1.
Figure 14:
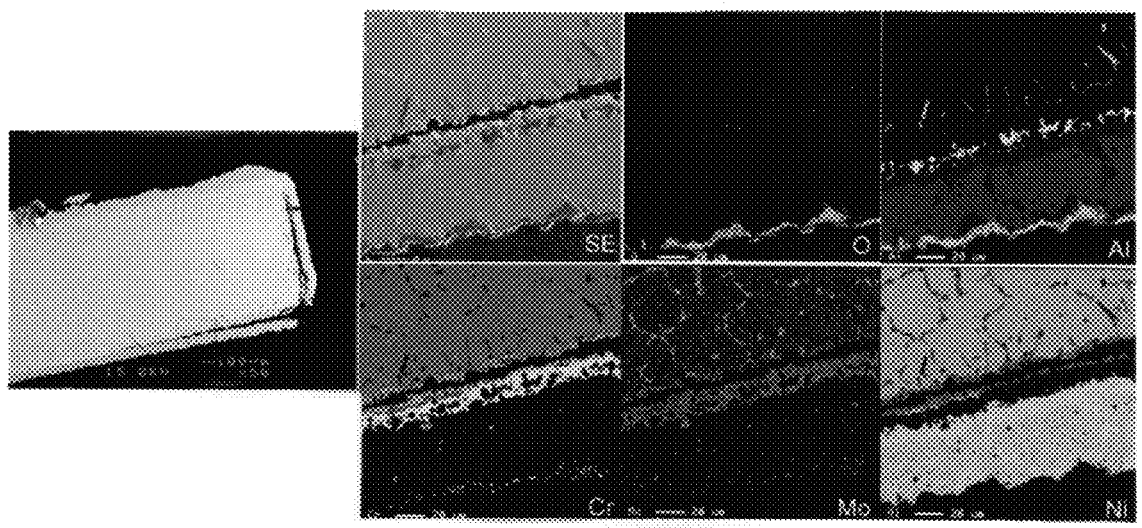
FIG. 14 is a metallographic photograph of a cross section of the peel-off portion and its vicinity of a protective layer formed by conventional Al diffusion treatment.
Figure 15:
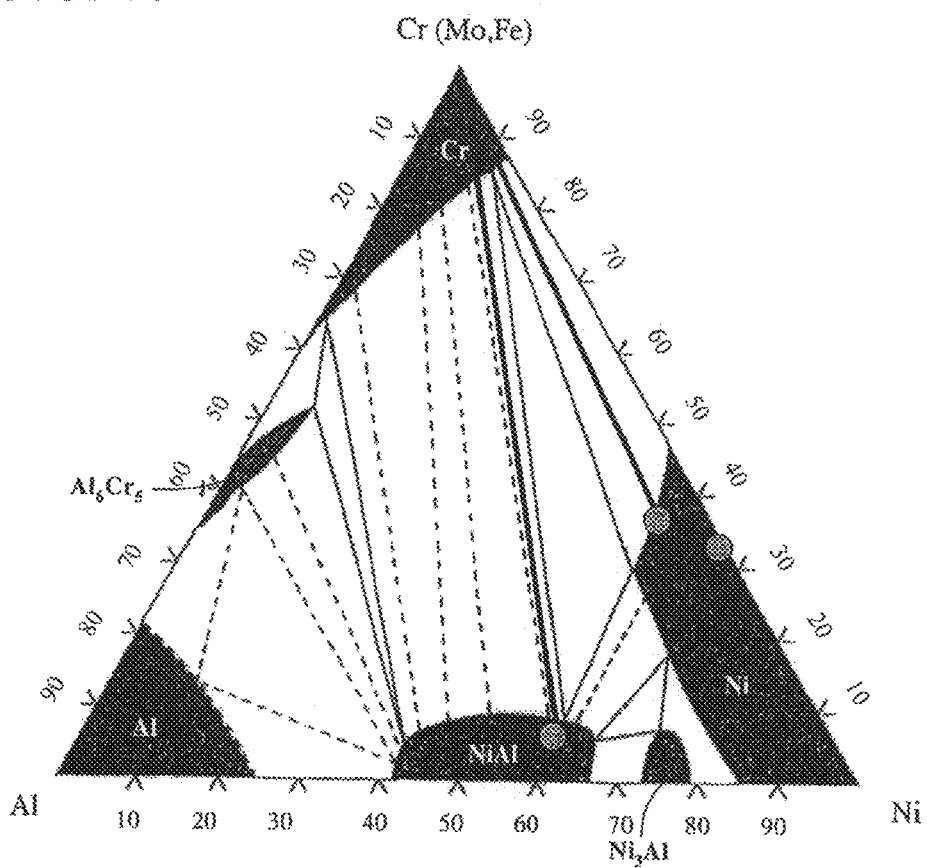
FIG. 15 is a Ni—Cr—Al ternary phase diagram for explanation of the peel off of the protective film, shown in FIG. 14.

The same substrate (specimen) of Ni-20 mass % Cr-18 mass % Fe-10 mass % Mo alloy as used in Example 1 was directly buried in the same mixed powder of Al, $Al_2O_3$ and $NH_4Cl$, and Al diffusion treatment of the substrate surface was carried out at 800° C. for 4 hours in an Ar atmosphere to form a Ni—Al protective film. FIG. 4 shows the metallographic structure in a cross section of the protective layer. As can be seen from FIG. 4, a Cr(Mo)-rich layer was formed at the interface between the substrate and the Ni—Al layer. Early peel off of the protective layer as shown in FIG. 14 would therefore be expected in its practical use.

Examples 3 to 5

Ni—B electroless plating was carried out on each of the same three substrates (specimens) of Ni-20 mass % Cr-18 mass % Fe-10 mass % Mo alloy to form a Ni—B plating film having a thickness of about 30 μm on each substrate. Thereafter, a $ZrO_2$ layer was formed on the surface of each of the Ni—B layers by a sol-gel method. The respective sol-gel treatments were carried out by using a treatment solution with varying Zr concentrations: 0.01 mol/L (Example 3), 0.05 mol/L (Example 4) and 0.1 mol/L (Example 5). Thereafter, each specimen with the two layers formed thereon was buried in a mixed powder of Al, $Al_2O_3$ and $NH_4Cl$, and Al diffusion treatment of the specimen was carried out at 800° C. for 4 hours in an Ar atmosphere to form a Ni—Al(B) protective film. Cross-sectional observation of the respective protective layers revealed no formation of a Cr(Mo)-rich layer at the interface between each substrate and the Ni—Al(B) layer as in the case of Example 1 (FIG. 3).

Figure 5:
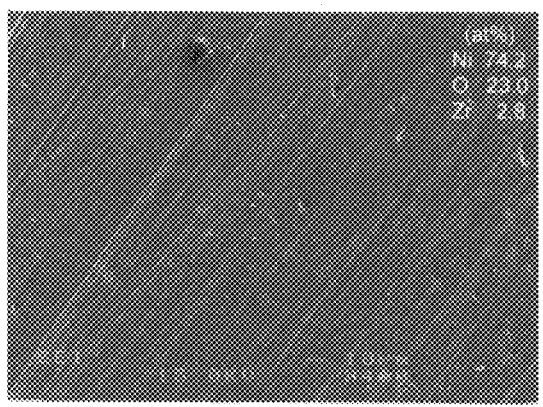
FIG. 5 is a photomicrograph of a surface of a specimen before Al diffusion treatment in Example 5.
Figure 6:
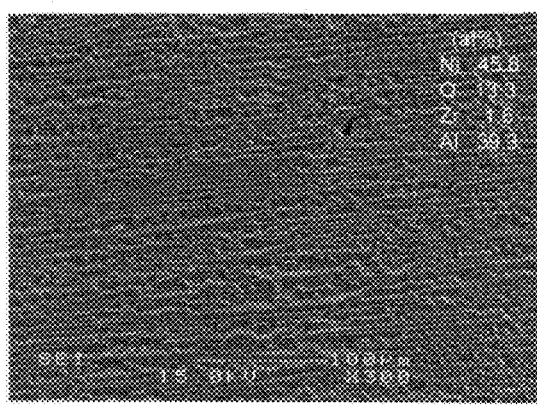
FIG. 6 is a photomicrograph of a surface of the specimen after Al diffusion treatment in Example 5.

In order to determine the state of diffusion of Al and Zr by the Al diffusion treatment, the specimen of Example 5, having the highest content of Zr, was subjected to compositional analysis in cross section of the protective layer. FIGS. 5 and 6 show SEM metallographic photographs of a cross section of the specimen before and after the Al diffusion treatment, respectively, and FIG. 7 shows the compositional analysis of the protective layer.

Figure 7:
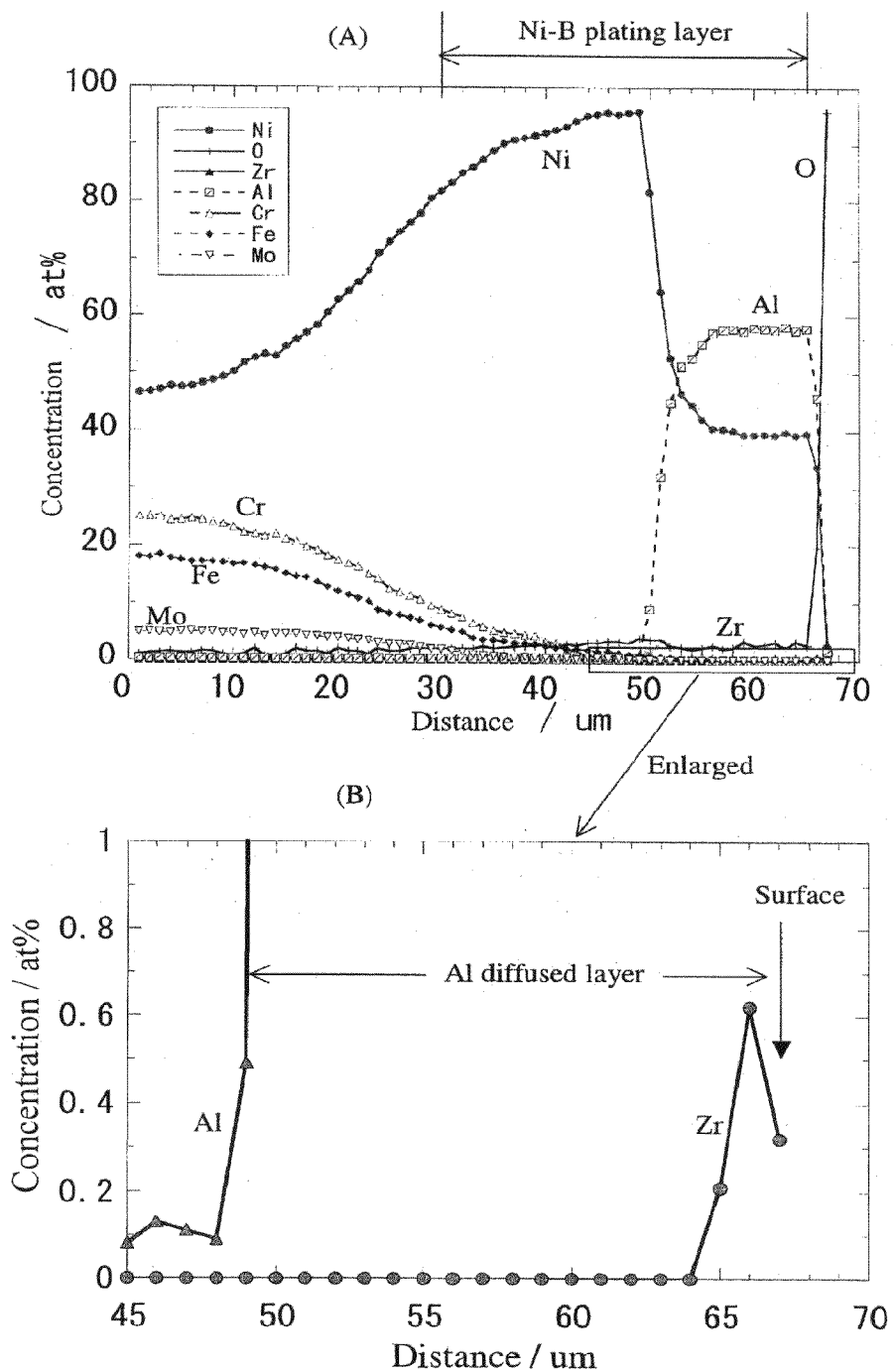
FIG. 7 is a graph showing the compositional analysis of a cross section of the protective layer portion of the specimen of Example 5.
Figure 13:
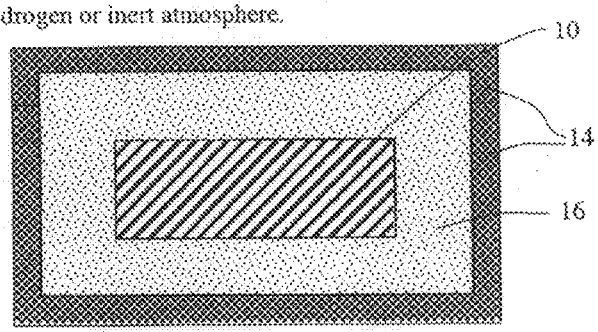
FIG. 13 is a diagram illustrating a conventional Al diffusion treatment process.

As can be seen from FIG. 7, an Al diffusion layer, having the composition of approximately 40 at % Ni-60 at % Al, was formed in the outer region of the Ni—B plating layer, and a thin Zr-rich layer was formed in the surface region of the Al diffusion layer.

<High-Temperature Corrosion Test>

The treated specimens of Examples 1, 3 to 5 were subjected to a high-temperature corrosion test under the heating cycle of 1000° C. and 750 hrs. FIG. 8 shows mass changes in the specimens during the high-temperature corrosion test. When an $Al_2O_3$ film grows up on the coating surface under a high temperature, the weight of the specimen increases, but if the $Al_2O_3$ film exfoliates, the weight of the specimen decreases. Furthermore, if the coating itself exfoliates by growing an α-Cr phase between the interface of the coating layer and the alloy substrate, a remarkable weight loss will occur. Therefore, the sample with a small amount of weight loss indicates that the coherency of the coating layer and the $Al_2O_3$ film are good.

No rapid decrease due to peel off of the coating layer was observed in any of the specimens. In the specimen of Example 1, however, a decrease in the weight was observed, which is considered to be due to peel off of a surface $Al_2O_3$ film. With respect to the specimens of Examples 3 to 5, on the other hand, less decrease in weight was observed with the increase in the Zr content, and no decrease in the weight was observed in the specimen of Example 5 even after 600 hrs.

FIGS. 9 through 12 show metallographic photographs of cross sections of the specimens of Examples 1, 3 to 5, respectively, after the high-temperature corrosion test. When Zr was not added, an alumina film was exfoliated from the surface of the sample and the surface was covered by a non-protective oxide scale shown in FIG. 9. On the other hand, the sample with Zr added by sol-gel method was covered by a protective alumina film shown in FIGS. 10 through 12.

The data thus demonstrates the effectiveness of the addition of Zr to the protective layer according to the method of the present invention.

Example 6

A $ZrO_2$ layer was formed on a substrate (specimen) of Ni-8 mass % Cr-10 mass % Co-3 mass % Ta-5.5 mass % Al-1 mass % Ti-1.5 mass % Hf alloy by a sol-gel method, using a treatment solution having a Zr concentration of 0.1 mol/L.

Figure 18:
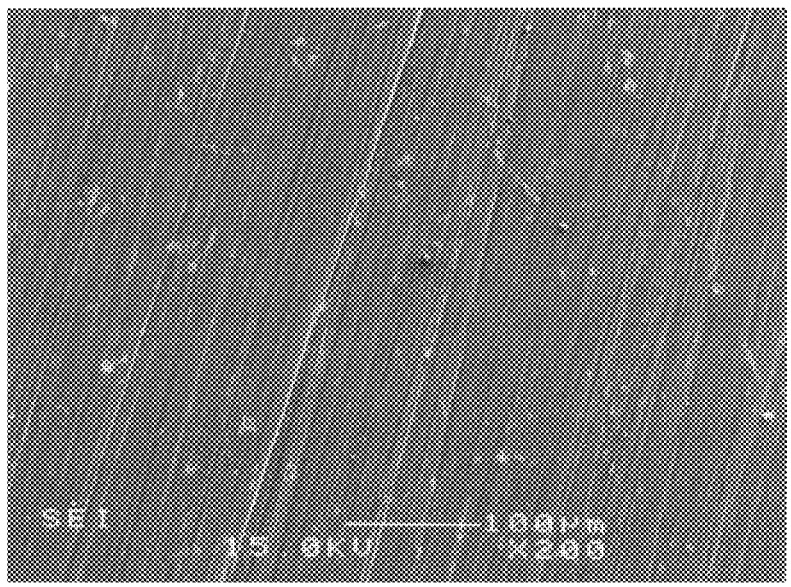
FIG. 18 shows a photograph of the surface of a specimen after treatment in Example 6, together with the elemental analysis of the surface of the treated specimen by EPMA (electron probe microanalysis).

Thereafter, Al diffusion treatment was carried out in the same manner as in Examples 3 to 5. FIG. 18 shows a photograph of the surface of the specimen after the treatment, together with the elemental analysis of the surface of the treated specimen by EPMA (electron probe microanalysis). As shown in FIG. 18, the treated specimen contained 1.7 at % (atomic percentage) of Zr in the surface. The treated specimen is therefore expected to effectively prevent peel off of a protective oxide film as in the case of Examples 3 to 5.

Figure 16:
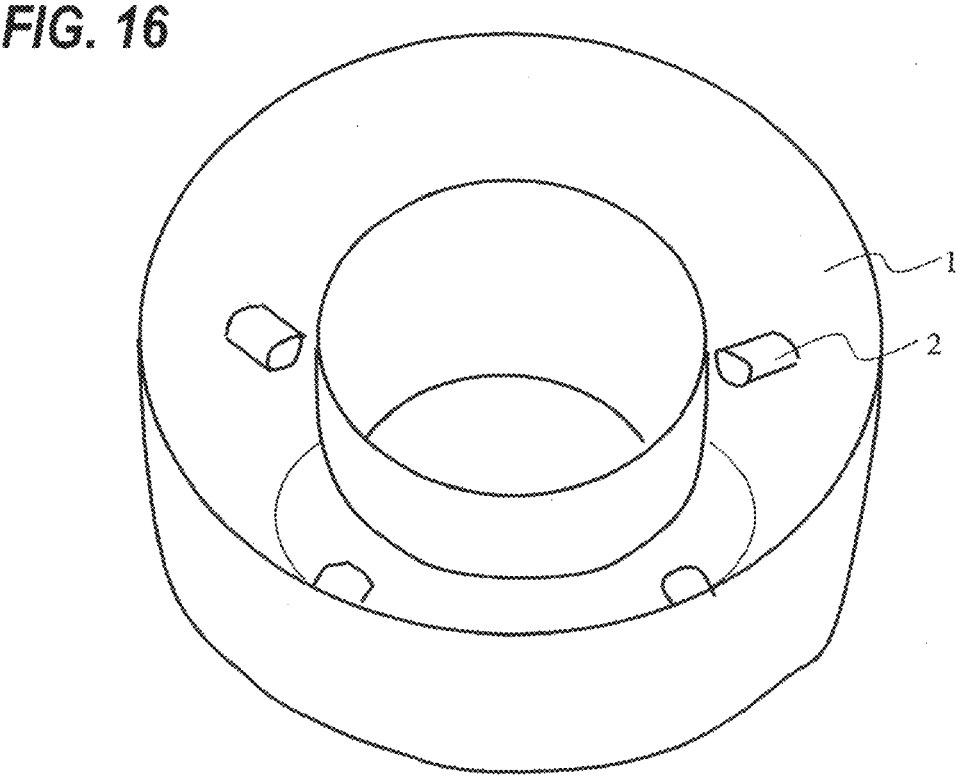
FIG. 16 is a perspective view of a combustor liner of a micro gas turbine according to the present invention.

It is expected from the results obtained in the Examples that when a Ni—Al protective film is formed on e.g. a combustor of a micro gas turbine as shown in FIG. 16, made of Ni-20 mass % Cr-18 mass % Fe-10 mass % Mo alloy, in the manner according to the present invention, peel off of the Ni—Al coating layer and peel off of an $Al_2O_3$ film, which will be formed in the surface of the coating layer, will be prevented, resulting in the extended life of the combustor. FIG. 16 shows fuel injection nozzles 2 of a combustor liner 1 of a micro gas turbine, to which the present invention can be advantageously applied. These nozzles project from the inner surface of the combustor liner.

What is claimed is:

1. A method for forming a corrosion-resistant film, comprising the steps of: carrying out Ni plating of a surface of a substrate of a Ni—Cr alloy to form a Ni layer on the substrate surface; forming a $ZrO_2$ layer on the substrate surface by a sol-gel method after the formation of the Ni layer; and carrying out Al diffusion treatment of the surface of the Ni layer to form a protective layer of Ni—Al, wherein the Al diffusion treatment is carried out on the $ZrO_2$ layer.

2. A method for forming a corrosion-resistant film, comprising the steps of: carrying out Ni—B plating of a surface of a substrate of a Ni—Cr alloy to form a Ni—B layer on the substrate surface; forming a $ZrO_2$ layer on the substrate surface by a sol-gel method after the formation of the Ni—B layer; and carrying out Al diffusion treatment of the surface of the Ni—B layer to form a protective layer of Ni—Al(B), wherein the Al diffusion treatment is carried out on the $ZrO_2$ layer.

3. In a method for forming a corrosion-resistant protective film of a Ni—Al alloy on a surface of a substrate of a Ni-based alloy by carrying out Al diffusion treatment of the substrate surface, the improvement comprising carrying out the Al diffusion treatment after forming a $ZrO_2$ layer on the substrate surface by a sol-gel method, thereby allowing Zr to diffuse into at least part of the protective film of Ni—Al alloy.

4. In a method for forming a corrosion-resistant protective film of a Ni—Al alloy on a surface of a substrate of a Ni—Cr alloy by carrying out Al diffusion treatment of the substrate surface, the improvement comprising carrying out the Al diffusion treatment after forming a $ZrO_2$ layer on the substrate surface by a sol-gel method, thereby allowing Zr to diffuse into at least part of the protective film of Ni—Al alloy.

* * * * *